United States Patent [19]

Suzuki

[11] Patent Number: 4,731,684
[45] Date of Patent: Mar. 15, 1988

[54] PIVOTABLE CHANGEOVER MECHANISM FOR LOADING AND EJECTING FUNCTIONS IN CASSETTE TAPE RECORDER

[75] Inventor: Shoji Suzuki, Iwaki, Japan
[73] Assignee: Alpine Electronic, Ltd., Japan
[21] Appl. No.: 846,573
[22] Filed: Mar. 31, 1986

[30] Foreign Application Priority Data

Mar. 30, 1985 [JP] Japan .............................. 60-47176[U]

[51] Int. Cl.⁴ .................... G11B 15/665; G11B 15/675
[52] U.S. Cl. ..................................... 360/96.5; 360/85; 360/95
[58] Field of Search ..................... 360/96.5, 96.6, 85, 360/95

[56] References Cited

U.S. PATENT DOCUMENTS

| | | | |
|---|---|---|---|
| 4,408,236 | 10/1983 | Murata et al. | 360/85 |
| 4,562,496 | 12/1985 | Saito et al. | 360/95 |
| 4,611,251 | 9/1986 | Yokoo | 360/95 |

*Primary Examiner*—Robert S. Tupper
*Attorney, Agent, or Firm*—Guy W. Shoup

[57] ABSTRACT

A pivotable changeover mechanism switches the power transmission path from a single reversible motor between parts performing a tape loading function and parts performing a tape unloading and cassette ejecting function in a cassette tape recorder. The pivotable changeover mechanism has a pivotable arm supporting a drive pinion, and the free end of the arm is connected to a shiftable reversing lever through a torsion spring which biases the pivotable lever positively in one direction and then the other, to mesh the pinion with a positive motion cam for unloading the tape and then with a cassette driving gear for ejecting the tape cassette to an unloading position. Through a connecting linkage, the reversing lever is shifted to switch the pinion from driving the positive motion cam to driving the unloading gear only after the positive motion cam has been rotated to fully unload the tape from the recorder head. Thus, ejecting the tape cassette is safely performed only after the tape has been fully unloaded from the recorder head.

5 Claims, 17 Drawing Figures

PIVOTABLE CHANGEOVER MECHANISM FOR LOADING AND EJECTING FUNCTIONS IN CASSETTE TAPE RECORDER

BACKGROUND OF THE INVENTION

1. Field of the Invention:

The present invention relates to an eject control mechanism in a cassette tape recorder in which the loading of a cassette tape case onto a feed reel shaft and a take-up reel shaft and the loading of the thus-inserted cassette tape case for contact of tape with a rotary head drum as well as the unloading and eject of the same case are performed by a single reversible motor, characterized in that an ejecting movement of a cassette holder is prevented positively until termination of unloading.

2. Description of the Prior Art:

For effecting image recording and reproduction by a cassette type video tape recorder (hereinafter referred to simply as "VTR"), it is necessary to load a cassette tape case onto feed reel and take-up reel shafts of VTR and effect loading to bring a cassette tape into contact with a rotary head drum.

The above operations have heretofore been performed in such a manner that the loading of the cassette tape is effected by a cassette tape loading motor, while the loading of the cassette tape case is performed manually. However, a manual loading of the cassette tape case sometimes causes mistaking the surface of the cassette tape case for the back or the front for the rear, or vice versa, resulting in the tape winding around a component of VTR. In view of this point there has been proposed a VTR in which after insertion of a cassette tape case into a cassette holder, the loading of the cassette tape case is performed automatically by movement of the cassette holder and the cassette tape case is ejected also by movement of the cassette holder.

In such VTR wherein the loading and eject of the cassette tape case are performed by movement of the cassette holder, it has been necessary to provide a reversible motor for moving the cassette holder separately from the above loading motor, for example, as shown in U.S. Pat. No. 3,964,096. Thus, two motors—the loading motor and the cassette holder moving motor—are used, so it is necessary to control the operation of these two motors so that the loading may be done at an appropriate timing. And the VTR has been provided with a control section to effect such control. As a result, the VTR becomes large-sized and expensive.

To avoid such inconvenience it has been proposed to effect insertion and eject as well as loading and unloading of a cassette tape case by the use of a single motor. However, where a single motor is used to perform these operations, in the event an eject operation starts before completion of unloading, the tape drawn out from the cassette tape case will be caught in a loading block and broken.

SUMMARY OF THE INVENTION

In view of the above-mentioned problems the present invention has been accomplished for the purpose of providing an eject control mechanism in a cassette type VTR wherein the insertion and eject as well as loading and unloading of a cassette tape case are performed by a single motor, the eject control mechanism being capable of preventing the movement of a cassette holder positively until termination of unloading.

To achieve the above object, the present invention is characterized in that a pivotable arm having a pinion which is rotated by a suitable drive means is pivotably supported by a chassis, said pinion being switched to either a loading power transfer path or an eject power transfer path in accordance with a pivotal motion of the pivotable arm; a reversing lever for pivotally moving the pivotable arm to effect such switching is pivotably supported by the chassis; and a retaining member is provided which is adapted to occupy a position in and withdraw from a pivoting area of the reversing lever for switching the pinion to either the loading power transfer path or the eject power transfer path, the movement of the retaining member being interlocked with components of the loading power transfer path to prevent the retaining member from withdrawing from the pivoting area of the reversing lever until termination of unloading during unloading and eject operation.

DESCRIPTION OF A PREFERRED EMBODIMENT

The present invention will be described below more concretely on the basis of a preferred embodiment thereof illustrated in the accompanying drawings.

Figure 12:
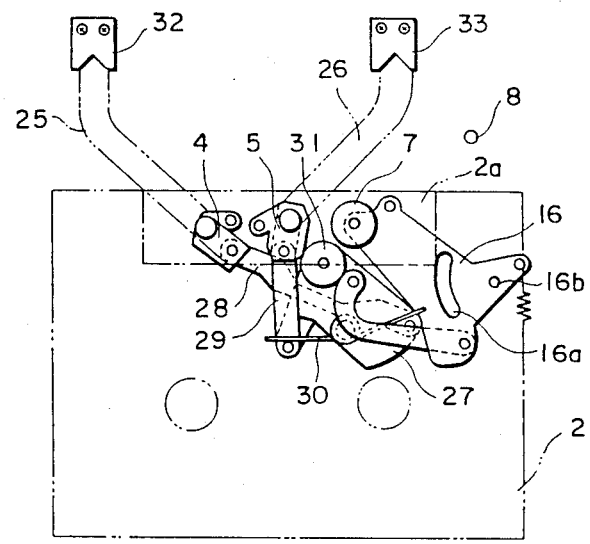
FIGS. 12 and 13 are views explanatory of loading.
Figure 13:
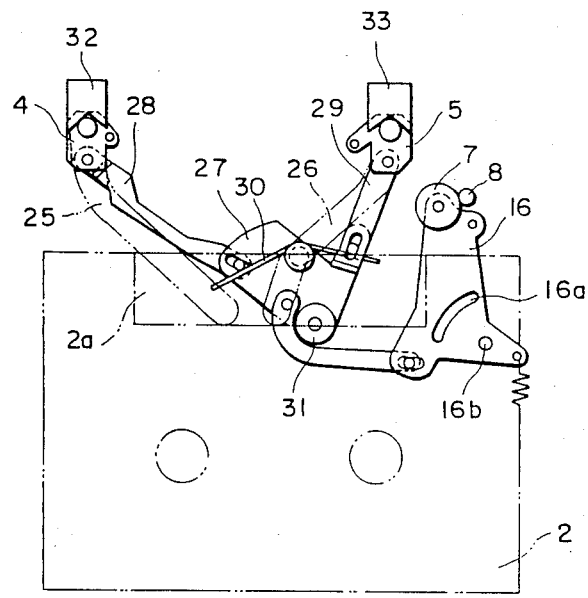

An outline will first be given about the movement of a cassette holder 1 and loading with reference to FIGS. 11 through 13. When an operating button (not shown) is operated after insertion of a cassette tape case 2 into the cassette holder 1, a reversible motor 3 (see FIG. 1) starts operation to move the cassette holder 1 horizontally in the direction of arrow P in FIG. 11 until reaching a predetermined position, whereupon the cassette holder 1 moves vertically downward, thereby allowing the cassette tape case 2 to be loaded. In an opening portion 2a of the thus-loaded cassette tape case 2 are positioned loading blocks 4 and 5 as shown in FIG. 12. As the reversible motor 3 continues to rotate, the loading blocks 4 and 5 are moved upward in the same figure, then go out from the opening portion 2a of the cassette tape case 2 as shown in FIG. 13 and draw out a tape 6 (see FIG. 2). Thus loading is performed. Thereafter, a pinch roller 7 (see FIG. 2) moves to bring the tape 6 into pressure contact with a capstan 8 (see FIG. 2), now ready for image recording and reproduction by VTR.

An outline of operation is as explained above. Construction and a more detailed operation will be descried below.

Figure 2:
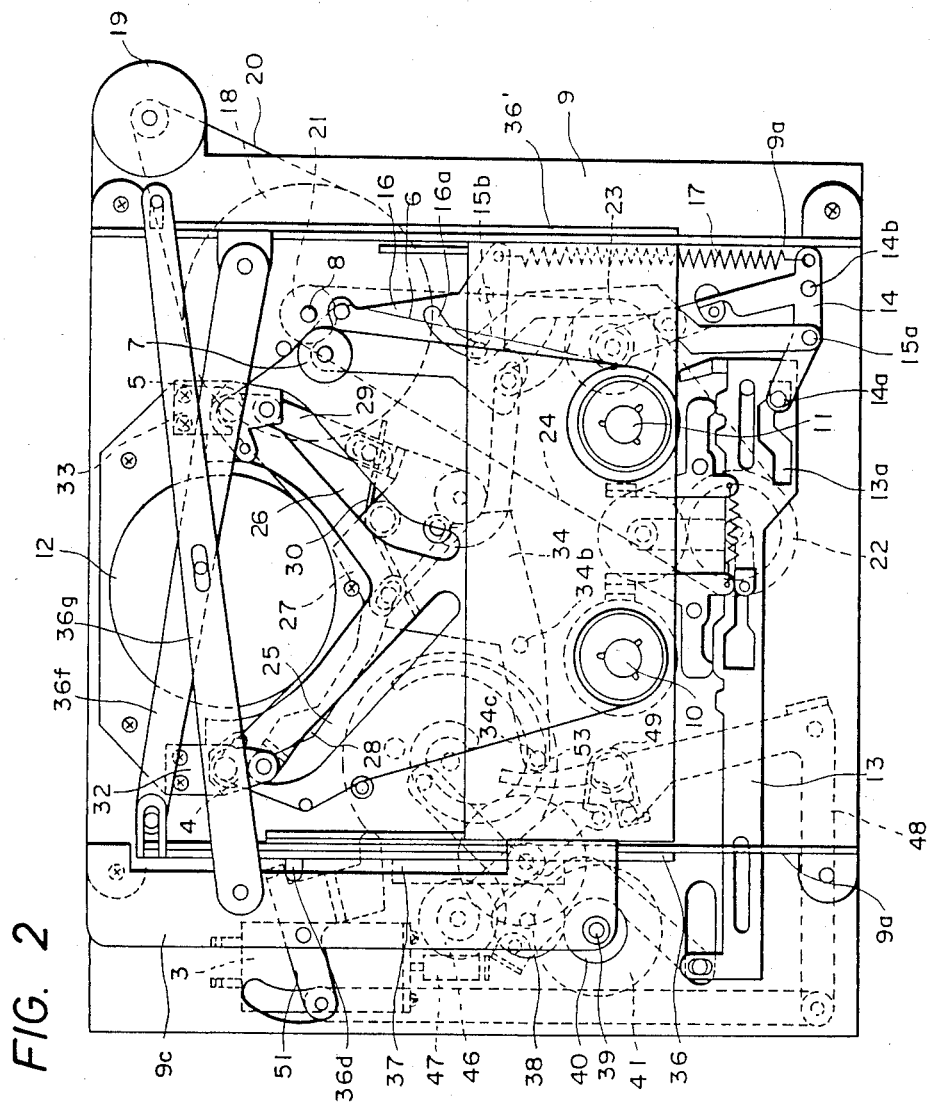
FIG. 2 is a plan view with an internal structure shown in broken lines.
Figure 4:
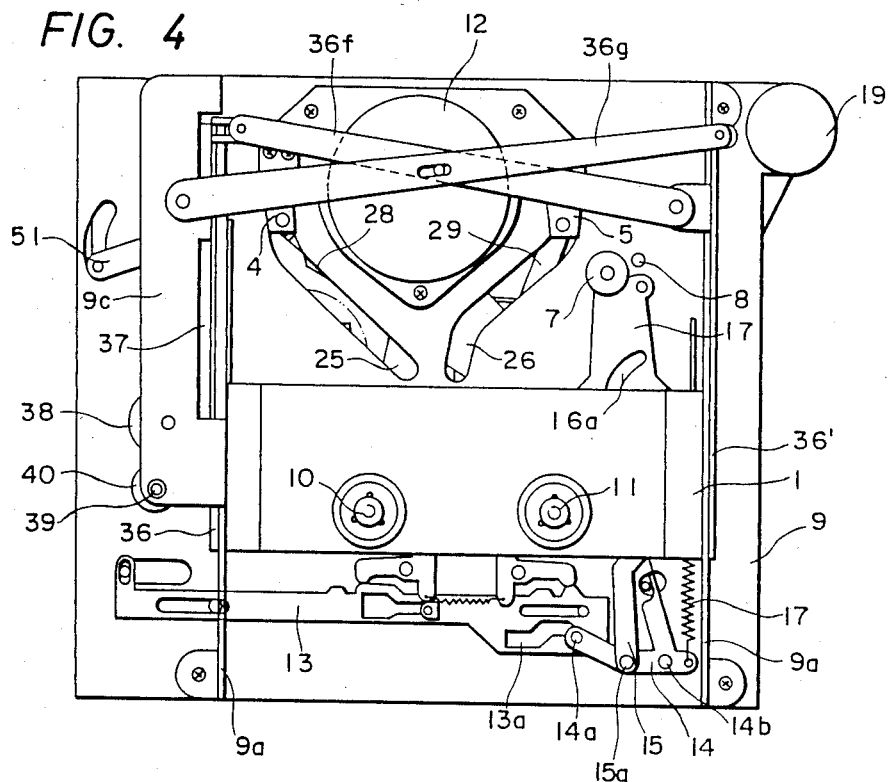
FIG. 4 is a plan view.
Figure 5:
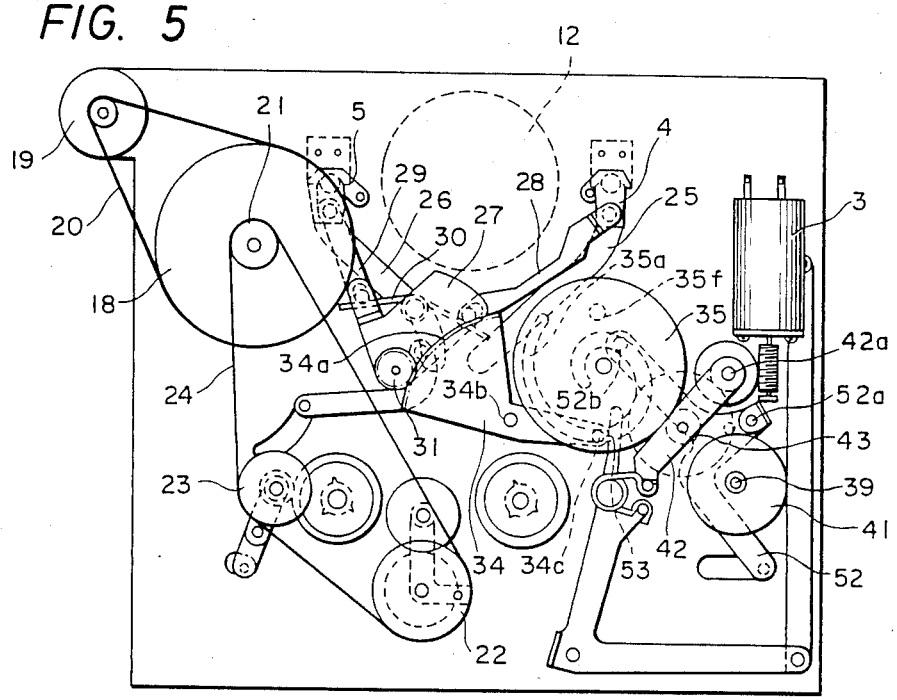
FIG. 5 is a bottom view with a sub chassis removed.
Figure 6:
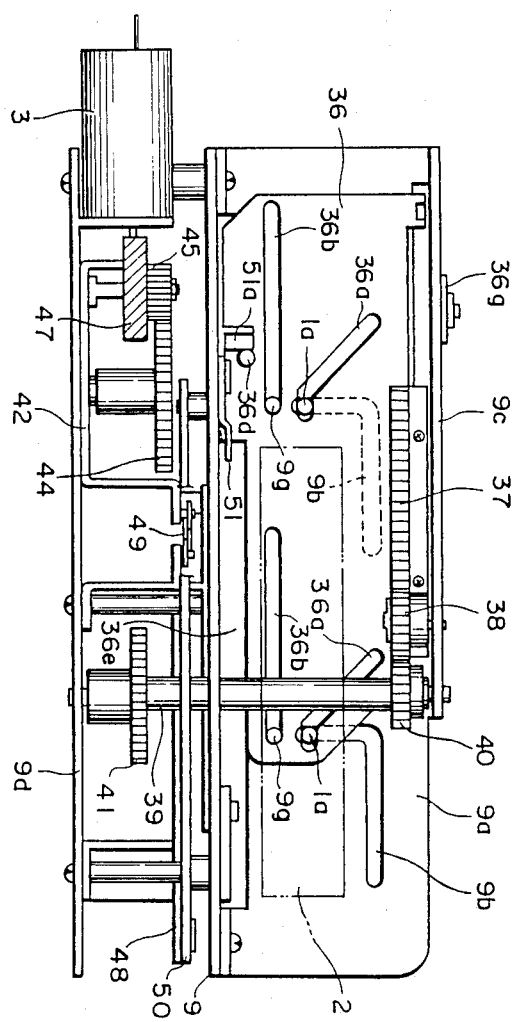
FIG. 6 is a left side view.
Figure 7:
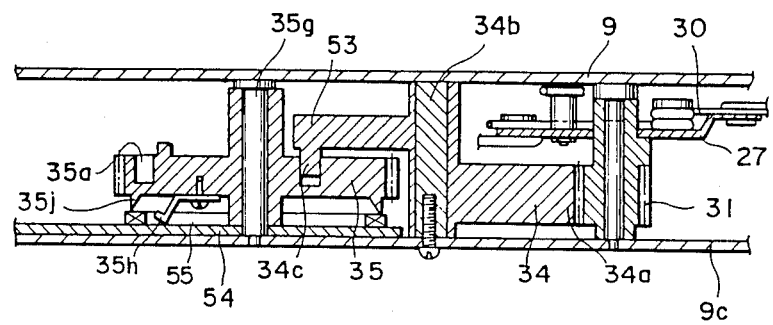
FIG. 7 is a sectional view showing a relation between a positive motion cam and a sector gear.
Figure 8:
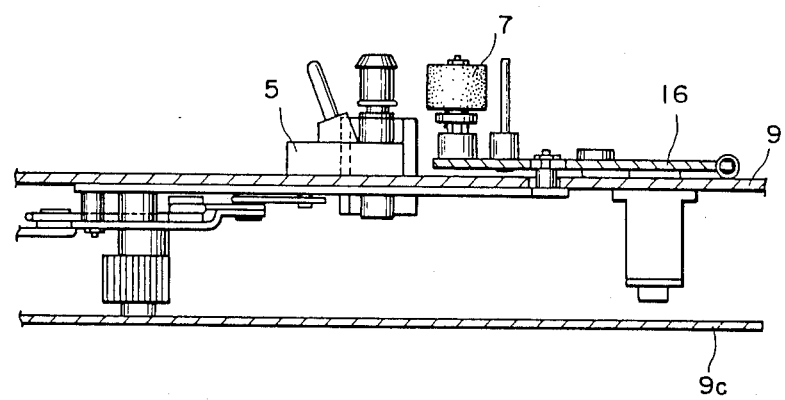
FIG. 8 is a sectional view showing a relation between a loading arm and a pinch roller supporting plate.
Figure 9:
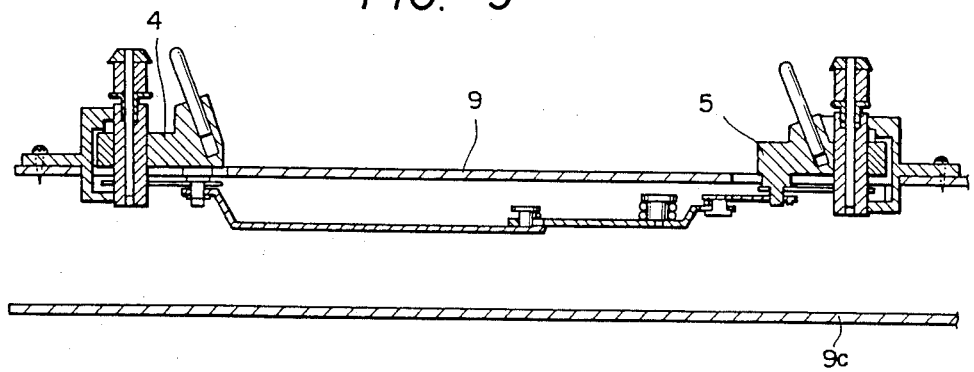
FIG. 9 is a sectional view of a loading block.
Figure 10:
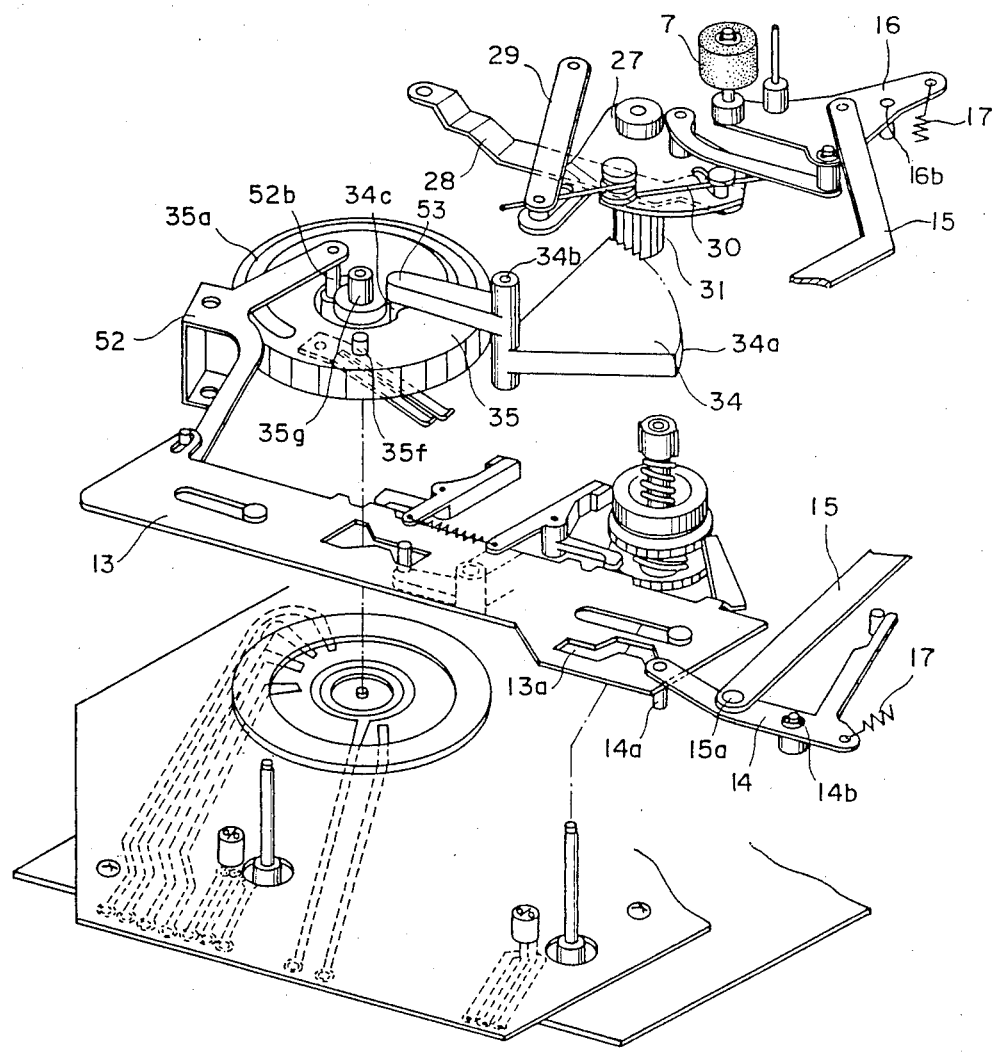
FIG. 10 is an exploded perspective view of a loading construction.

A chassis 9 is provided with a feed reel shaft 10 and a take-up reel shaft 11 for the supply and take up of the tape 6 in the cassette tape case 2. The tape 6 from the feed reel shaft 10 is wound up on the take-up reel shaft 11 via the loading block 4, a rotary head drum 12, the loading block 5, pinch roller 7 and capstan 8. In FIGS. 2 and 4, the tape 6 is in a stopped condition, so the pinch roller 7 and the capstan 8 are in an isolated state.

The chassis 9 is further provided with a control plate 13 slidably in a transverse direction in FIGS. 2 and 4. A chevron-like through hole 13a is formed in a right end portion of the control plate 13, and a pin 14a provided at an end portion of a lever 14 is loosely fitted in the through hole 13a. A connecting plate 15 is connected to a central part of the lever 14 pivotably at 15a, the lever 14 being secured to the chassis 9 pivotably at 14b. A pin 15b provided at a free end portion of the connecting plate 15 is loosely fitted in an arcuate through hole 16a formed in a pinch roller supporting plate 16. The pinch roller supporting plate 16 supports the pinch roller 7 pivotably at one end portion thereof, and a tension coil spring 17 is stretched between the other end portion of the support plate 16 and a fore end portion of the lever 14. Further, the pinch roller supporting plate 16 is supported by the chassis pivotably at 16b. Therefore, as the control plate 13 slides rightwards in FIGS. 2, 4, 10 and 16, the pin 14a is guided by the chevron-like through hole 13a, so that the lever 14 is pivoted clockwise in those figures and pushes the connecting plate 15 upward. As a result, the pinch roller supporting plate 16 is released and pivotally moved clockwise in the same figures by the biasing force of the tension coil spring 17, thus causing the tape 6 to come into pressure contact with the capstan 8.

A flywheel 18 is fitted on the shaft of the capstan 8 and a belt 20 is stretched over a capstan motor 19 and the flywheel 18 to rotate the capstan 8. Further, a belt 24 is stretched over a pulley 21 which is fitted on the shaft of the capstan 8 and driving pulleys 22 and 23 which are supported by the chassis 9 through shafts, to thereby drive the feed reel shaft 10 and take-up reel shaft 11.

The loading blocks 4 and 5 are slidable within guide holes 25 and 26 formed in the chassis 9. In the figures, the numeral 27 denotes an arm whose top portion is pivotally supported by the chassis 9. The arm 27 pivotably supports at one end thereof an end portion of a connection arm 28 which supports the loading block 4, and also pivotably supports at the other end thereof an end portion of a connecting arm 29 which supports the loading block 5. Moreover, a torsion coil spring 30 is attached to an approximately central part of the arm 27 and both ends of the spring 30 are engaged with support points of the connecting arms 28 and 29. Further, a third loading gear 31 is mounted integrally with the arm 27, and stoppers 32 and 33 of the loading blocks 4 and 5 are provided at fore end portions of the guide holes 25 and 26.

The numeral 34 in the drawings denotes a sector gear provided with a second loading gear 34a which is in mesh with the third loading gear 31. The sector gear 34 is supported at an approximately central part thereof by the chassis 9 pivotably at 34b, and a pin 34c provided at an end portion of the sector gear 34 is loosely fitted in a cam groove 35a of a positive motion cam 35.

Figure 1:
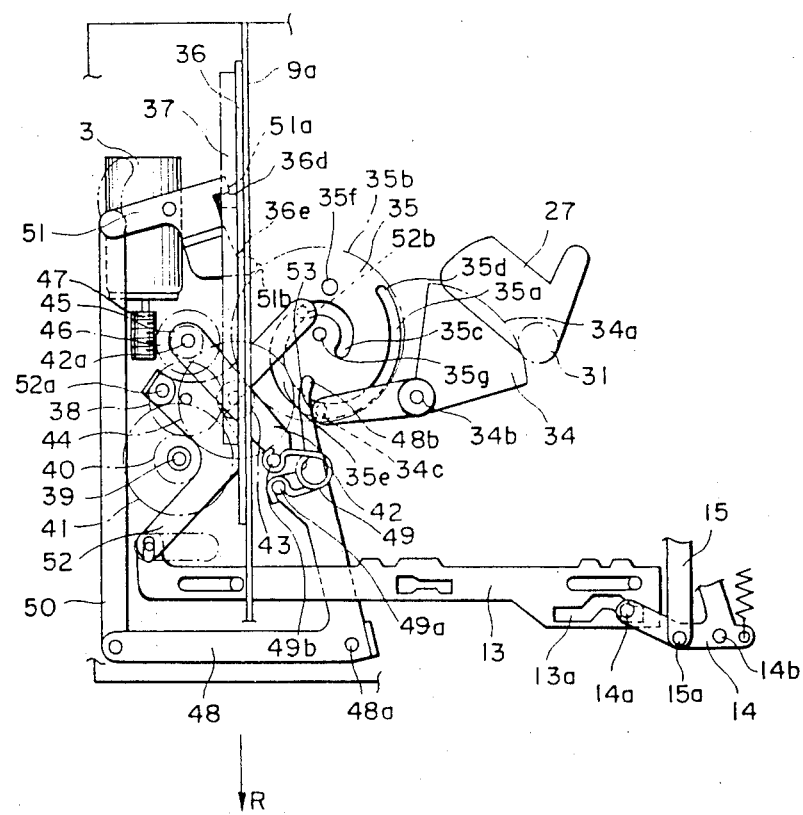
FIG. 1 is a schematic plan view of a principal portion of a cassette tape recorder according to the present invention.
Figure 3:
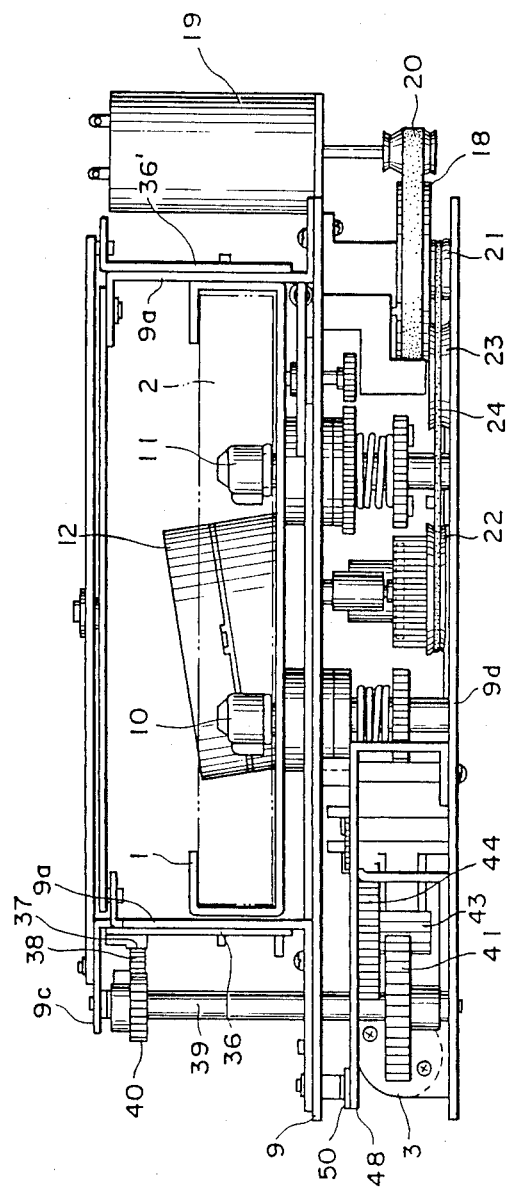
FIG. 3 is a front view.

The positive motion cam 35 is supported by the chassis 9 pivotably at 35g and its outer peripheral surface is formed with a first loading gear 35b. As shown in FIG. 1, the cam groove 35a of the positive motion cam 35 is composed of an inside arcuate groove 35c of a suitable length formed around the shaft 35g, an outside arcuate groove 35d of a suitable length formed around the shaft 35g, and a connection groove 35e which connects the arcuate grooves 35c and 35d. The pin 34c of the sector gear 34 is loosely fitted in the cam groove 35a so as to be movable therewithin. An end portion of the sector gear 34 where the pin 34c is provided serves as a retaining member 53 adapted to be engaged with and disengaged from a retaining end 48b of a reversing lever 48 as will be described later. The positive motion cam 35 is formed with a retaining projection 35f.

The above first loading gear 35b, positive motion cam 35, sector gear 34, second loading gear 34a, third loading gear 31 and arm 27 constitute a loading power transfer path.

The construction of an eject power transfer path for movement of the cassette holder 1 will be described below.

Figure 11:
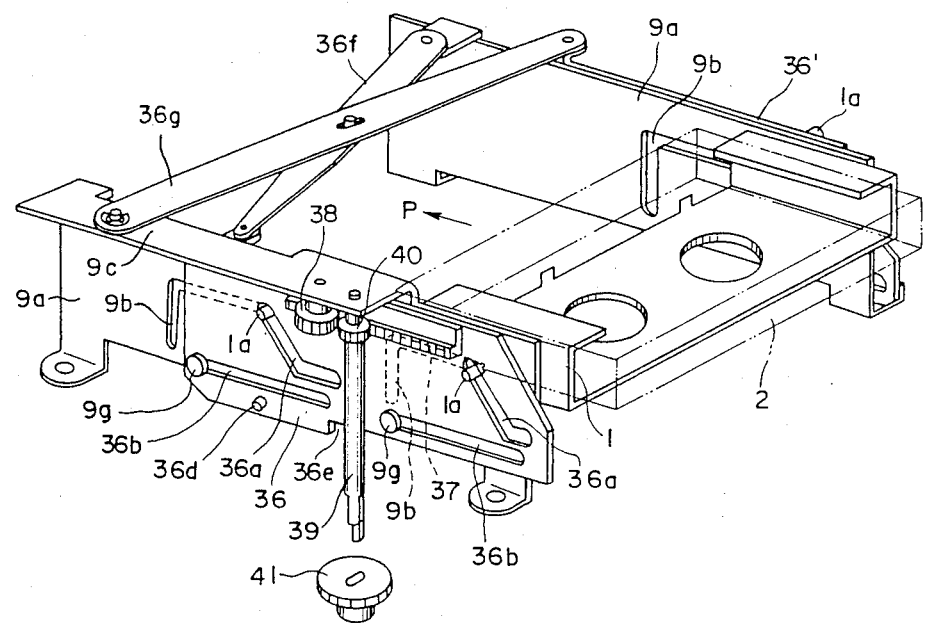
FIG. 11 is a view explanatory of movement of a cassette holder.

As shown in FIG. 11, the cassette holder 1 is positioned between side plates 9a which are erected on the chassis 9, and two pins 1a are projected from one side of the cassette holder 1, while a single pin 1a is projected from the other side face, the pins 1a being loosely fitted in L-shaped through holes 9b formed in the side plates 9a. Outside the side plates 9a are positioned slide plates 36 and 36' which are movable in sliding contact with the side plates 9a, and in inclined through holes 36a formed in the slide plate 36 and 36' are loosely fitted the pins 1a of the cassette holder 1 which have been loosely fitted in the L-shaped through holes 9b of the side plates 9a. Further, long through holes 36b are formed in the slide plates 36 and 36', in which are loosely fitted pins 9c projecting from the side plates 9a to guide sliding motions of the slide plates 36 and 36'. One slide plate 36 is formed with a rack 37 as a fourth gear for moving the cassette holder. In the drawings, the numerals 36f and 36g denote connecting arms for moving the slide plates 36 and 36' interlockedly. One end of one connecting arm 36f is pivotably connected to the slide plate 36 provided with the rack 37, while the other end thereof is pivotably connected to the side plate 9a with which the slide plate 36' is in sliding contact, and one end of the other connecting arm 36g is pivotably connected to the slide plate 36' not provided with the rack 37, while the other end thereof is pivotably connected to the side plate 9a with which the slide plate 36 is in sliding contact. Further, for pivotable and slidable connection of approximately central portions of the connecting arms 36f and 36g, a pin 36h planted in an approximately central part of one connecting arm 36f is loosely fitted in a long through hole 36i formed longitudinally in an approximately central part of the other connecting arm 36g.

A third gear 38 for moving the cassette holder, which is in mesh with the rack 37, is pivotably connected to a top plate portion 9c formed by bending the upper portion of the side plate 9a. Between the top plate portion 9c and the sub chassis 9d is provided a counter shaft 39 extending through the chassis 9, and a second gear 40 for moving the cassette holder, which is in mesh with the cassette holding moving third gear 38, is fitted on an upper portion of the counter shaft 39, while on a lower portion of this counter shaft is mounted a first gear 41 for moving the cassette holder at almost the same height as the first loading gear 35b of the positive motion cam 35.

The numeral 42 in the drawings denotes a pivotable arm one end of which is pivotably supported by the chassis 9, and a pinion 43 is connected to an approximately central part of the arm pivotably. The pinion 43 is positioned between the first loading gear 35b and the first gear 41 for moving the cassette holder, and it is adapted to rotate upon pivoting of the pivotable arm 42 and come into engagement with either of the first loading gear 35b and the first cassette moving gear 41. A large idle gear 44 is fitted on the shaft of the pinion 43 so that both pivot in synchronism with each other. Further, a small idle gear 45 which is in mesh with the large idle gear 44, and a worm wheel 46, are fitted on a pivot shaft 42a of the pivotable arm 42. The worm wheel 46 is in mesh with a worm 47 which is fitted on an output shaft of the reversible motor 3.

Figure 14:
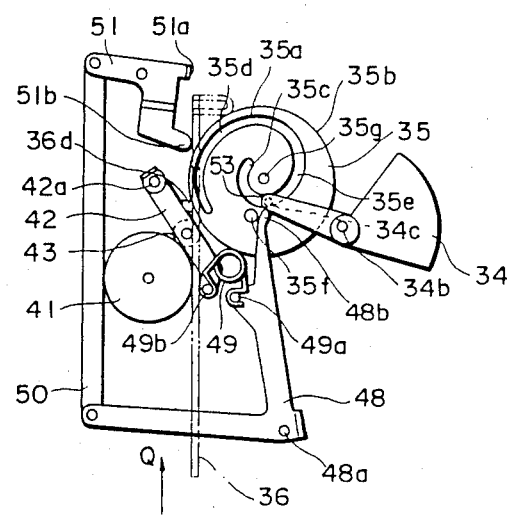
FIGS. 14 and 15 are plan views for explaining operations of a principal portion.
Figure 15:
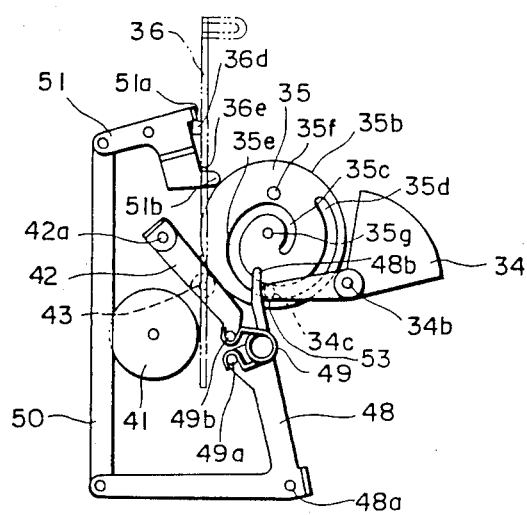
Figure 16:
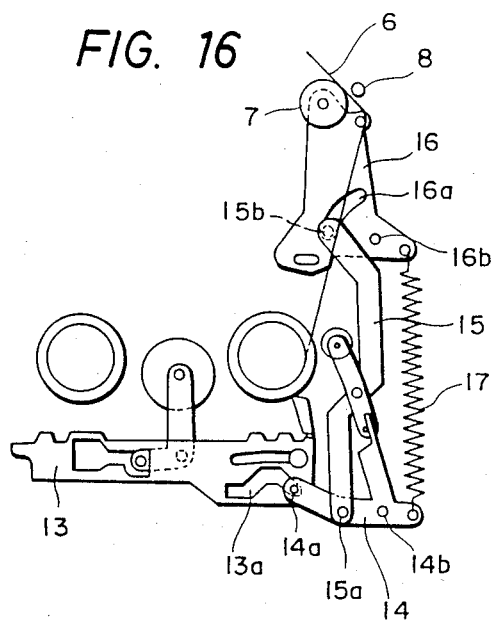
FIGS. 16 and 17 are plan views explanatory of a relation between a pinch roller and a capstan.
Figure 17:
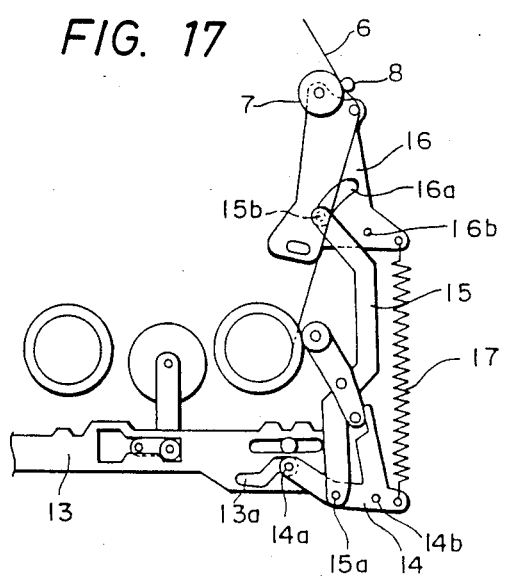

The numeral 48 in the drawings denotes a reversing lever supported by the chassis 9 pivotably at 48a. The reversing lever 48 is generally V shaped and at the bent part of the V shape it is connected to the chassis 9 through the pivot shaft 48a. A torsion coil spring 49 is stretched between a part of the reversing lever 48 and a fore end portion of the pivotable arm 42, and the reversing lever 48 is pivotably supported at 48a so that a support portion 49a of the torsion coil spring 49 on the side of the reversing lever 48 can be positioned on both the first loading gear 35b side and the first cassette holder moving gear 41 side with respect to a straight line passing through a support point 49b of the spring 49 on the side of the pivotable arm 42 and also through the pivot shaft 42a of the pivotable arm 42. At an end portion of the reversing lever 48 on the side where it supports the torsion coil spring 49, there is formed a retaining end portion 48b adapted to engage both a retaining projection 35f of the positive motion cam 35 and an end portion of the sector gear 34 which end portion serves as the retaining member 53 provided with the pin 34c. When the retaining end portion 48b and the end portion of the sector gear 34 serving as the retaining member 53 are engaged with each other as shown in FIG. 14, the sector gear 34 is prevented from pivoting counterclockwise in the same figure. On the other hand, when both are engaged together as shown in FIG. 15, the reversing lever 48 is prevented from pivoting clockwise in the same figure.

To the other end portion of the reversing lever 48 is connected one end of a connecting plate 50 pivotaly, the other end of which supports a retaining lever 51 pivotably. The lever 51 is pivotably connected to the chassis 9 and one end thereof is formed with a bent portion 51a which is engaged with a projection 36d projecting upward from the slide plate 36, while the other end of the lever 51 is formed with a projecting portion 51b which is fitted in a notch 36e formed in a lower edge portion of the slide plate 36.

The numeral 52 in the drawings denotes a lever supported by the chassis 9 pivotably at 52a. One end of the lever 52 is pivotably connected to an end portion of the control plate 13, while at the other end thereof is provided a pin 52b which is loosely fitted in the cam groove 35a of the cam 35. The pin 52b and the pin 34c of the sector gear 34 are in a positional relation in which when one pin is positioned in the connecting groove 35e, the other pin is positioned in any arcuate groove.

The following description is now provided about the operation of the above-constructed embodiment of the present invention.

Before insertion of the cassette tape case 2, the cassette holder 1 is positioned at upper portions of the side plates 9a as shown in FIG. 11 and the power transfer path is in such a state as shown in FIG. 14 in which the pinion 43 and the first gear 41 for moving the cassette holder are in mesh with each other. In this case, as shown in FIG. 14, the support point 49a of the torsion coil spring 49 on the side of the reversing lever 48 is positioned on the side of the first loading gear 35b with respect to a straight line passing through the pivot shaft 42a of the pivotable arm 42 and also through the support point 49b of the spring 49 on the side of the pivotable arm 42, so that the pinion 43 is positively engaged with the first cassette holder moving gear 41 by virtue of an expanding bias of the torsion coil spring 49.

When an operating button (not shown) is operated after insertion of the cassette tape case 2 into the cassette holder 1 in such a state, the reversible motor 3 rotates in a forward direction, thereby causing the large idle gear 44 to rotate through the worm 47, worm wheel 46 and the small idle gear 45 which rotates in synchronism with the worm wheel 46, so that the pinion 43 mounted on the same shaft as the large idle gear 44 rotates. In this case, the rotating direction of the pinion 43 is a counterclockwise direction in FIG. 14, and the rotation of the reversible motor 3 which causes the pinion 43 to rotate in this direction is here assumed to be a forward rotation.

Upon rotation of the pinion 43, the first cassette holder moving gear 41 engaged with the pinion 43 and the second cassette holder moving gear 40 coaxial with the gear 41 rotate in a clockwise direction and the third cassette holder moving gear 38 engaged with the second cassette holder moving gear 40 rotates in a counterclockwise direction. As a result, the slide plate 36 having the rack 37 engaged with the third gear 38 moves in the direction of arrow Q in FIG. 14 and the slide plate 36′ which is connected to the slide plate 36 through the connecting arms 36f and 36g moves in the same direction. Further, the cassette holder 1 having the pins 1a which are loosely fitted in the inclined through holes 36a formed in the slide plates 36 and 36′ also moves in the same direction, namely, in the direction of arrow P in FIG. 11.

During the above movement of the cassette holder 1, when the pins 1a are positioned on the horizontal portions of the L-shaped through holes 9b of the side plates 9a, the cassette holder 1 moves horizontally in the direction of arrow P in FIG. 11 as mentioned above. But once positioned in the vertical portions of the L-shaped through holes 9a, the pins 1a move downward through the said vertical portions while moving downward through the inclined through holes 36a of the slide plates 36 and 36′, so that the cassette holder 1 moves vertically downward. As a result, the cassette tape case 2 is fitted on the feed reel shaft 10 and the take-up reel shaft 11, and now the movement of the slide plates 36 and 36′ is over.

Almost simultaneously with termination of the above movement of the slide plate 36, the projection 36d projecting from the slide plate 36 comes into engagement with the bent portion 51a of the retaining lever 51, thereby causing the lever 51 to pivot counterclockwise in FIG. 14, wile the projecting portion 51b is positioned within the notch 36e of the slide plate 36 to prevent the slide plate 36 from moving in the direction of arrow Q in the same figure. Upon this pivotal movement, the connecting plate 50 moves in the direction of arrow Q in FIG. 14, so the reversing lever 48 pivots counterclockwise in the same figure. At this time, the support point 49a of the torsion coil spring 49 on the side of the reversing lever 48 is positioned on the first cassette holder moving gear 41 side with respect to a straight line passing through the pivot shaft 42a of the pivotable arm 42 and also through the support point 49b of the spring 49 on the side of the pivotable arm 42, so that the pinion 43 is brought into engagement with the first loading gear 35b y virtue of an expanding bias of the torsion coil spring 49, as shown in FIG. 15.

Since the pinion 43 is rotating counterclockwise as mentioned above, the positive motion cam 35 having the first loading gear 35b engaged with the pinion 43 rotates clockwise. But unless the reversing lever 48 pivots couterclockwise, the retaining end 48b of the lever 48 engages the end portion of the sector gear 34 where the retaining member 52 is formed, and the pin 34c at the said end portion is fitted in the cam groove 35a, so the positive motion cam 35 does not rotate. When the reversing lever 48 piovts counterclockwise as mentioned above and the pinion 43 comes into engagement with the first loading gear 35b, the positive motion cam 35 turns clockwise in FIG. 14, whereupon the pin 34c of the sector gear 34 positioned in the connecting groove 35e of the cam groove 35a is guided by the groove 35e and turns counterclockwise about the shaft 34b of the sector gear 34. As a result, the sector gear 34 turns counterclockwise and assumes its position shown in FIG. 15. As the sector gear 34 thus turns, the arm 27 having the third loading gear 31 engaged with the second loading gear 34a of the sector gear 34 turns clockwise in FIG. 12 and pushes the connecting arms 28 and 29 through the torsion coil spring 30. Then, the loading blocks 4 and supported by the connecting arms 28 and 29 move upward in the same figure while being guided by the guide holes 25 and 26 and come into abutment with the stoppers 32 and 33. Further, by virtue of the bias of the torsion coil spring 30, the loading blocks 4 and 5 are urged against the stoppers 32 and 33 to effect loading of the tape 6.

A positional relation of components at the end of loading of the tape 6 is shown in FIGS. 1, 2 and 15. The positive motion cam 35 is further turned clockwise in FIG. 1 by the pinion 43, whereupon the pin 52b of the lever 52 located in the connecting groove 35e of the cam groove 35a is guided by the connecting groove 35e about the pivot shaft 52a of the lever 52 and turns counterclockwise in FIG. 1, so that the lever 52 pivots counterclockwise in the same figure. As a result, the control plate 13 which pivotably supports the lever 52 moves rightward in FIG. 1 and the pinch roller 7 is brought into pressure contact with the capstan 8 as previously noted. Thereafter, the rotation of the reversible motor 3 stops.

During the above pivotal movement of the lever 52, the pin 34c of the sector gear 34 is positioned in the outside arcuate groove 35d, so the sector gear 34 never turns. On the other hand, when the sector gear 34 turns with its pin 34c positioned in the connecting groove 35e, the pin 52b of the lever 52 is positioned in the inside arcuate groove 35c of the cam groove 35a, so the lever 52 never turns. Thus, before insertion of the cassette tape case 2, the pin 34c of the sector gear 34 is positioned near the connection of the inside arcuate groove 35c of the cam groove 35a and the connecting groove 35e thereof, and the pin 52b of the lever 52 is positioned near an end portion of the inside arcuate groove 35c of the cam groove 35a. Further, during image recording or reproduction of the tape 6, the pin 34c is positioned near an end portion of the outside arcuate groove 35d of the cam groove 35a and the pin 52b is positioned near the connection of the outside arcuate groove 35d and the connecting groove 35e.

When an eject button (not shown) is operated, the reversible motor 3 rotates in a reverse direction to effect unloading of the tape 6 and eject of the cassette tape case 2, and the pinion 43 rotates clockwise, thus causing the positive motion cam 35 to rotate counterclockwise in FIG. 1, so that first the control plate 13 which has moved to the rightmost position moves leftward and assumes its position shown in FIG. 1 and the pinch roller 7 becomes isolated from the capstan 8. Then, the sector gear 34 turns clockwise in FIG. 1 and causes the arm 27 to turn counterclockwise to effect unloading. After completion of unloading, the retaining projection 35f of the positive motion cam 35 pushes the retaining end portion 48b of the reversing lever 48 to pivot the lever clockwise in FIG. 1. At this time, the end portion of the sector gear 34 which serves as a retaining member is already outside the pivoting area of the reversing lever 48. With the pivotal movement of the reversing lever 48, the support point 49a assumes a position on the side of the positive motion cam 35 with respect to a straight line passing through pivot shaft 42a of the pivotable arm 42 and the support point 49b, so that the pinion 43 comes into engagement with the first cassette holding moving gear 41 by virtue of an expanding bias of the torsion coil spring 49. Further, with the pivotal movement of the reversing lever 48, the retaining lever 51 pivots clockwise in FIG. 1 through the connecting plate 50 and the projecting portion 51b of the retaining lever 51 withdraws from the notch 36e of the slide plate 36, thus permitting movement of the slide plate 36. Thereafter, as the pinion 43 rotates clockwise, the third cassette holder moving gear 38 turns clockwise, the slide plate 36 having the rack 37 moves in the direction of arrow R in FIG. 1 and the cassette holder 1 moves vertically and then horizontally contrary to the foregoing case, whereby the cassette tape case 2 is ejected.

In the above unloading and eject operations, unless the positive motion cam 35 rotates clockwise in FIG. 1 to rotate the sector gear 34 in the same direction, the clockwise movement of the reversing lever 48 for switching the pinion 43 to the eject power transfer path cannot be done. This is because the retaining member 53 formed as an end portion of the sector gear 34 prevents the lever 48 from pivoting in the said direction as shown in FIGS. 1 and 15. That is, only after unloading is performed by the rotation of the sector gear 34, the retaining member 53 withdraws from the pivoting area of the reversing lever 48, so the cassette tape case can be ejected only after completion of unloading.

In the present invention, as set forth hereinabove, a pivotable arm having a pinion which is rotated by a suitable drive means is pivotably supported by a chassis, the pinion being switched to either a loading power transfer path or an eject power transfer path in accordance with a pivotal movement of the pivotable arm; a reversing lever for pivoting the pivotable lever to effect the said switching is pivotably supported by the chassis;

and a retaining member is provided which is adapted to occupy a position in and withdraw from a pivoting area of the reversing lever for switching the pinion to either the loading power transfer path or the eject power transfer path, the movement of the retaining member being interlocked with components of the loading power transfer path to prevent the retaining member from withdrawing from the pivoting area of the reversing lever until termination of unloading during unloading and eject operation.

Thus, before termination of unloading it is impossible to effect switching to the eject power transfer path, so the breakage of tape can be prevented which will occur if the eject operation is performed before termination of unloading. Besides, since the switching operation from the loading power transfer path to the eject power transfer path is interlocked with the components of the former path, the breakage of tape can be prevented more certainly. Further, a simple structure permits reduction of the cost and the utility of a cassette tape recorder which performs both loading and eject by a single motor can be enhanced.

What is claimed is:

1. A pivotable changeover mechanism for performing the loading and ejecting functions in a cassette tape recorder having a chassis, a single reversible motor in the chassis providing a power output in a forward direction for moving a tape cassette inserted in the chassis to a loading position and loading a tape in the cassette around a recorder head by forwardly pivoting a pair of loading arms, and in a reverse direction for reversedly pivoting the loading arms to unload the tape from the recorder head and ejecting the tape cassette from the chassis, said pivotable changeover mechanism comprising:

a rotatable first gear (41) in mesh with a cassette moving mechanism for moving the inserted cassette to a loading position when said first gear is rotated in a forward direction, and for moving the cassette from the loading position to an ejection position when said first gear is rotated in a reverse direction;

a rotatable positive motion cam (35) having a spiral groove formed therein, extending between an outer (35d) position and an inner (35c) position, in which one end of a pivotable sector gear (34) is slidably retained for pivoting the sector gear correspondingly in response to rotation of the positive motion cam in forward and reverse directions, said sector gear being meshed with a tape moving mechanism for forwardly and reversedly pivoting said pair of loading arms to load and unload the tape around the recorder head, said inner position of said groove corresponding to pivoting of said pair of loading arms to a position in which the tape is fully unloaded from the recorder head;

a retaining lever (51) having a retaining end which is shiftable between a retaining position in which said retaining end locks the cassette moving mechanism from movement, and a release position in which the cassette moving mechanism is released for movement;

a reversing lever connected on one end to said retaining lever and having another end engageable with said one end of said sector gear (34) such that said reversing lever is shifted between a first position and a second position when said one end of said sector gear is slidably moved between said outer position and said inner position of said groove, respectively, by rotation of said positive motion cam, said reversing lever being shifted to said second position only when said one end of said sector gear has moved substantially completely to said inner position of said groove, said retaining lever being shifted from said retaining position to said release position to release said cassette moving mechanism for movement only when said reversing lever is shifted to said second position; and a pivotable arm (42) having one end pivotally mounted to the chassis, a pinion (43) supported at an intermediate portion thereof and being driven in forward and reverse rotation by the reversible motor for performing the loading and ejecting functions, respectively, and a fore end biasedly connected to a part of said reversing lever for positively switching said pinion between a position in mesh with said positive motion cam and a position in mesh with said rotatable first gear, wherein said pinion is switched to mesh with said rotatable first gear for moving the cassette for ejection from the chassis only after said one end of said sector gear is moved to the inner position of said groove, wherein the tape is fully unloaded from the recorder head, said reversing lever is shifted to said second position, and said retaining lever is shifted to said release position to release said cassette moving mechanism.

2. An eject control mechanism according to claim 1, wherein a large idle gear is fitted on a shaft of said pinion, and a small idle gear meshing with said large idle gear as well as a worm wheel are fitted on a pivot shaft of said pivotable arm, said worm wheel being in mesh with a worm fitted on an output shaft of the reversible motor.

3. An eject control mechanism according to claim 1, wherein said reversing lever is generally V-shaped and is supported by the chassis pivotably at the bent portion of the V-shape, and said reversing lever has retaining end portion adapted to engage said end of said sector gear.

4. An eject control mechanism according to claim 1, wherein a torsion coil spring is engaged with the part of said reversing lever and also with the fore end portion of said pivotable arm.

5. An eject control mechanism according to claim 1, wherein said end portion of said sector gear has a pin engaged in said groove.

* * * * *